(12) United States Patent
Tago et al.

(10) Patent No.: US 12,107,470 B2
(45) Date of Patent: Oct. 1, 2024

(54) ROTARY ELECTRIC MACHINE AND IN-VEHICLE MOTOR SYSTEM

(71) Applicant: Hitachi Astemo, Ltd., Hitachinaka (JP)

(72) Inventors: Kazutami Tago, Tokyo (JP); Itsuki Shimura, Tokyo (JP); Junnosuke Nakatsugawa, Tokyo (JP); Wataru Yokoyama, Hitachinaka (JP); Ippei Suzuki, Hitachinaka (JP)

(73) Assignee: Hitachi Astemo, Ltd., Ibaraki (JP)

( * ) Notice: Subject to any disclaimer, the term of this patent is extended or adjusted under 35 U.S.C. 154(b) by 265 days.

(21) Appl. No.: 17/786,626

(22) PCT Filed: Dec. 15, 2020

(86) PCT No.: PCT/JP2020/046661
§ 371 (c)(1),
(2) Date: Jun. 17, 2022

(87) PCT Pub. No.: WO2021/145119
PCT Pub. Date: Jul. 22, 2021

(65) Prior Publication Data
US 2023/0024138 A1 Jan. 26, 2023

(30) Foreign Application Priority Data
Jan. 14, 2020 (JP) .................. 2020-003747

(51) Int. Cl.
*H02K 1/27* (2022.01)
*H02K 1/276* (2022.01)
(Continued)

(52) U.S. Cl.
CPC ............. *H02K 21/16* (2013.01); *H02K 1/276* (2013.01); *H02K 7/006* (2013.01); *H02K 2213/03* (2013.01)

(58) Field of Classification Search
CPC ........ H02K 21/16; H02K 1/276; H02K 7/006; H02K 2213/03; Y02T 10/64
See application file for complete search history.

(56) References Cited

U.S. PATENT DOCUMENTS

2008/0296990 A1 12/2008 Evans
2014/0145538 A1 5/2014 Date et al.
(Continued)

FOREIGN PATENT DOCUMENTS

JP 2014-107913 A 6/2014
JP 2014-233114 A 12/2014
(Continued)

OTHER PUBLICATIONS

International Search Report and Written Opinion for Application No. PCT/JP2020/046661, mailed Mar. 23, 2021.

*Primary Examiner* — Thomas Truong
(74) *Attorney, Agent, or Firm* — Volpe Koenig

(57) ABSTRACT

A rotary electric machine includes a stator including a coil, and a rotor in an inner peripheral side of the stator. The rotor core comprises a soft magnetic metal and a magnet within a magnet insertion hole, a first magnet stopper on a q axis side of the magnet in the magnet insertion hole, a magnet accommodation between the first magnet stopper on both sides of the magnet insertion hole, a first space portion communicating with the magnet insertion hole, a second space portion whose distance from the magnet is equal to or less than a thickness of the magnet and a radial length of a magnetic pole center is long, the second space portion formed on an inner peripheral side relative to the magnet, and a third space portion that has a convex shape on an inner peripheral side of a q axis of the magnet.

8 Claims, 17 Drawing Sheets

(51) Int. Cl.
*H02K 1/28* (2006.01)
*H02K 21/16* (2006.01)
*H02K 7/00* (2006.01)

(56) References Cited

U.S. PATENT DOCUMENTS

| | | |
|---|---|---|
| 2016/0065015 A1 | 3/2016 | Kameda et al. |
| 2016/0285326 A1 | 9/2016 | Kawamura et al. |
| 2018/0097413 A1* | 4/2018 | Sun .......................... H02K 1/28 |
| 2020/0014259 A1* | 1/2020 | Yabe ........................ H02K 1/27 |
| 2021/0013763 A1* | 1/2021 | Kobayashi ............. H02K 11/33 |

FOREIGN PATENT DOCUMENTS

| | | |
|---|---|---|
| JP | 2016-007136 A | 1/2016 |
| JP | 2017-050956 A | 3/2017 |
| JP | 2017-093059 A | 5/2017 |
| WO | 2007057412 A1 | 5/2007 |
| WO | 2014171133 A1 | 10/2014 |

* cited by examiner

SHAPE HAVING FIRST SPACE PORTION
AND GROOVE SPACE PORTION

SHAPE HAVING FIRST SPACE PORTION, GROOVE SPACE PORTION,
AND SECOND SPACE PORTION

SHAPE HAVING FIRST SPACE PORTION, GROOVE SPACE PORTION, SECOND SPACE PORTION, AND THIRD SPACE PORTION

THIRD SPACE PORTION SHAPE THAT IMPEDES FLOW OF MAGNETIC FLUX

ROTARY ELECTRIC MACHINE AND IN-VEHICLE MOTOR SYSTEM

TECHNICAL FIELD

The present invention relates to a rotary electric machine, and particularly relates to a permanent magnet type brushless motor suitable for use in an electric variable valve timing device for automobiles.

BACKGROUND ART

For automobiles in recent years, due to the shift from a hydraulic system to an electric system and the market expansion of hybrid automobiles and electric vehicles, electrification of a variable valve timing device (eVTC) that changes opening/closing timing of an intake/exhaust valve of an engine to an optimum value of the rotation speed and a load of the engine has progressed. This is because electrification of the variable valve timing device eliminates difficulty in operation due to decrease in fluidity of oil in a state where the engine is cooled in a hydraulic system and decrease in hydraulic pressure in a low-rotation region, and enables improvement in output and fuel efficiency.

When the opening/closing timing of the intake/exhaust valve of the engine is controlled according to the engine speed and the load, the faster the response of the eVTC is, the easier it is to perform the optimal control, and therefore, high response is required for the electric motor used for the eVTC.

PTL 1 discloses a prior art of a brushless motor that requires high response. The invention described in PTL 1 relates to an electrical machine having a rotor that is borne such that it can rotate about an axis of rotation, and a stator, and the rotor has at least one permanent magnet. The rotor alternately has a magnetic field focusing region and a magnetic field-free region in the rotor body parallel to the axis of rotation.

CITATION LIST

Patent Literature

PTL 1: WO 2007/57412

SUMMARY OF INVENTION

Technical Problem

The brushless motor disclosed in PTL 1 has much room for improvement regarding improvement in response speed. The present invention provides a motor capable of reducing rotor inertia and suppressing an increase in magnetic resistance and a decrease in torque.

Solution to Problem

A representative example of the invention disclosed in the present application is as follows. That is, a rotary electric machine includes a stator around which a coil is wound; and a rotor pivotally supported rotatably on an inner peripheral side of the stator, in which the rotor includes a core formed of a soft magnetic metal and a magnet mounted on the core, and the core includes a magnet insertion hole into which the magnet is mounted, a first magnet stopper portion provided on a q axis side of the magnet in the magnet insertion hole, a magnet accommodation portion provided between the first magnet stopper portions on both sides of the magnet insertion hole, a first space portion communicating with the magnet insertion hole, a second space portion whose distance from the magnet is equal to or less than a thickness of the magnet and a radial length of a magnetic pole center is long, the second space portion formed on an inner peripheral side relative to the magnet, and a third space portion that has a convex shape on an inner peripheral side of a q axis of the magnet, and is formed between the second space portion and the magnet.

Advantageous Effects of Invention

According to the present invention, it is possible to reduce rotor inertia while suppressing an increase in magnetic resistance and a decrease in torque. Problems, configurations, and effects other than those described above will be made clear by the description of the following embodiments.

DESCRIPTION OF EMBODIMENTS

Figure 1:
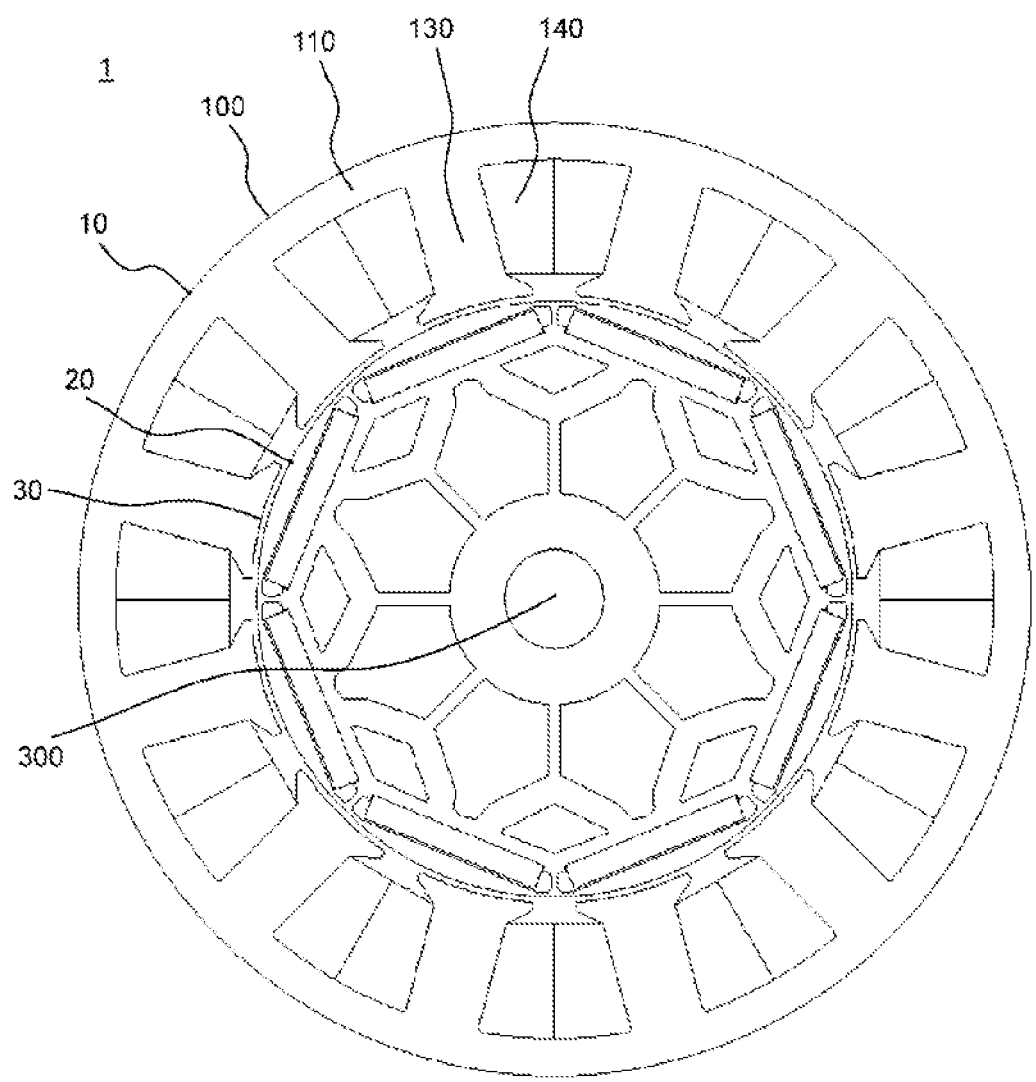
FIG. 1 is a cross-sectional view in a rotary surface of a permanent magnet type rotary electric machine of a first embodiment.

Embodiments of the present invention will be described in detail with reference to the drawings as appropriate. In the drawings, identical components are given identical reference signs, and the description will be omitted.

First Embodiment

Figure 2:
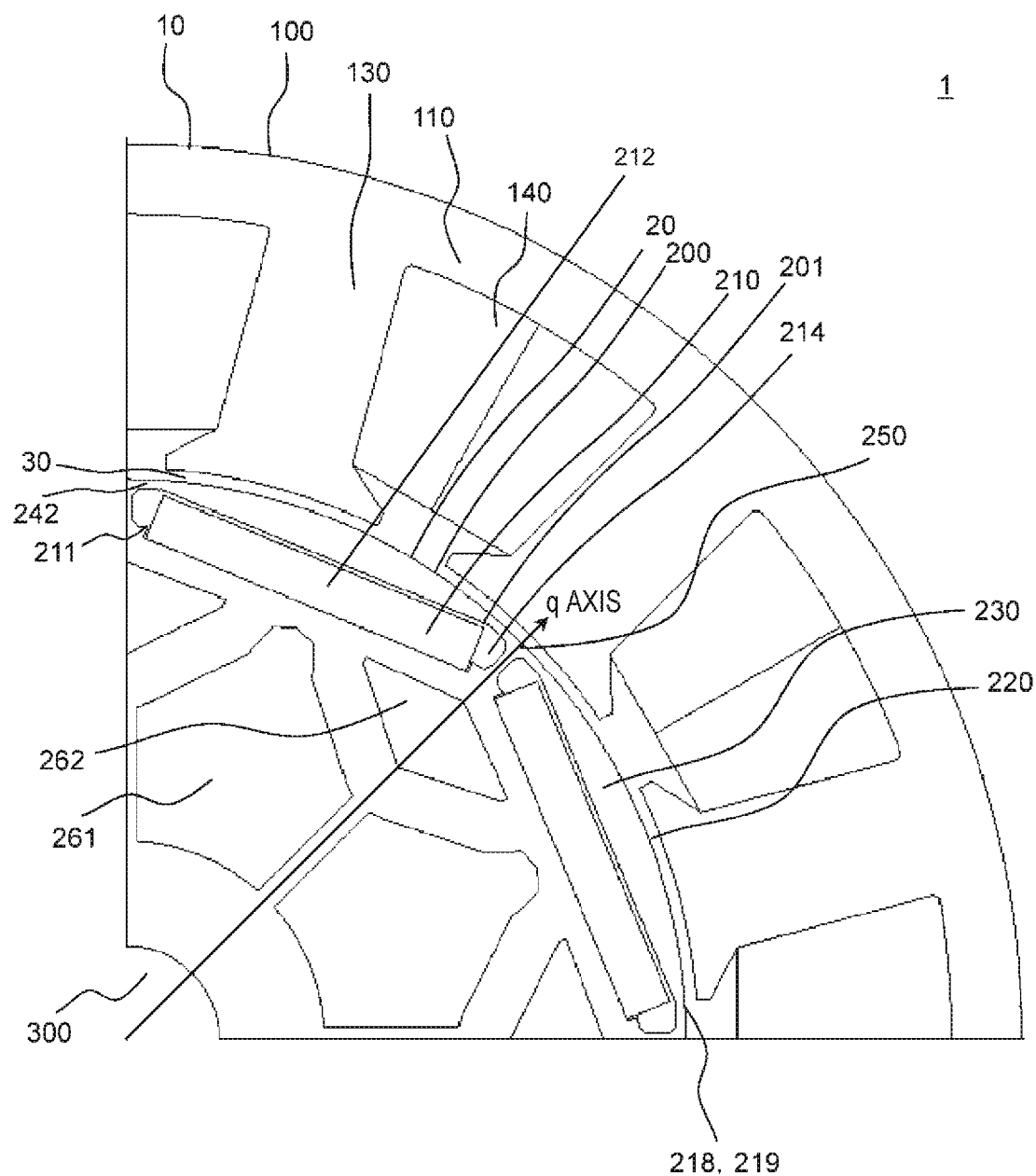
FIG. 2 is an enlarged view of a ¼ circumference of the rotary electric machine illustrated in FIG. 1.

The configuration of a permanent magnet type rotary electric machine 1 including a rotor core 200 of the first embodiment of the present invention will be described with reference to FIGS. 1 and 2. FIG. 1 is a cross-sectional view in a rotary surface of the permanent magnet type rotary electric machine 1 of the first embodiment, and FIG. 2 is an enlarged view of a ¼ circumference of the rotary electric machine illustrated in FIG. 1.

As illustrated in FIG. 1, the permanent magnet type rotary electric machine 1 is an 8-pole 12-slot, concentrated winding permanent magnet type rotary electric machine 1 in which a substantially annular stator 10 is disposed on the outer peripheral side and a substantially columnar rotor 20 is disposed on the inner peripheral side. An air gap 30 is provided between the stator 10 and the rotor 20. The stator 10 includes a stator core 100, a core back 110, and a plurality of windings 140, and is disposed to oppose the rotor 20 across the air gap 30.

The stator 10 is manufactured as follows, for example. First, a plurality of radial teeth 130 are formed on the inner peripheral side in a stator core laminate in which an integrally punched core material of electromagnetic steel sheets or soft magnetic metal sheets are laminated. Next, after a conductive wire is installed in each of the teeth 130 to form the winding 140, the winding 140 is integrated by shrink-fitting or press-fitting into a housing not illustrated. Thus, the stator 10 is manufactured.

The rotor 20 includes the rotor core 200, which is an iron core in which soft magnetic metal sheets such as electromagnetic steel sheets are laminated, and a shaft 300, which serves as an axis of rotation. The outer peripheral contour of the rotor core 200 is a perfect circle, and the outer periphery of the rotor core 200 is provided with an 8-pole magnetic pole portion 220 in the circumferential direction. Each pole of the magnetic pole portion 220 has one magnet insertion hole 201 that is long in the circumferential direction. Magnet stopper portions 211 are formed on the inner peripheral side of both ends of the magnet insertion hole 201, a magnet accommodation portion 212 is formed in the magnet insertion hole 201 between the magnet stopper portions 211, and one magnet 210 is disposed in one magnet accommodation portion 212.

As illustrated in FIG. 2, the rotor 20 includes a first space portion 213 communicating with the magnet insertion hole 201 on the outer peripheral side of the magnet stopper portion 211, and a bridge portion 242 on the outer peripheral side of the first space portion 213. An umbrella-shaped core 230 is formed on the outer peripheral side of the magnet accommodation portion 212. A second space portion 261 having a distance from the magnet 210 equal to or less than the thickness of the magnet 210 and having the longest; radial length at the center of the magnetic pole portion 220 is formed inside relative to the magnet 210. A third space portion 262 that is located between the second space portion 261 and the magnet 210 on the inner peripheral side relative to the magnet 210 and has a convex shape on the inner peripheral side of a q axis 250 is formed.

Here, the outer peripheral shape of the magnetic pole portion 220 in the first embodiment is a cylindrical shape, and its radius coincides with the radius of the rotor 20. The magnet 210 has a circumferentially long shape in which the distance from the magnet 210 of an adjacent magnetic pole is short and high torque is easily obtained. Therefore, it is possible to enhance the response by high torque.

On the other hand, the reason why the third space portion 262 has the convex shape on the inner peripheral side of the q axis 250 is that the flow of the magnetic flux connecting two magnets 210 arranged in two magnetic pole portions 220 adjacent to each other is not impeded, an increase in the magnetic resistance of the rotor core 200 is suppressed, and a torque decrease due to the increase in the magnetic resistance is suppressed. Therefore, the sum of the minimum width of the core on the outer peripheral side from the third space portion 262 and the minimum width of the core between the third space portion 262 and the second space portion 261 is about. 0.57 times the magnet width/2. This ratio is preferably equal to or greater than 0.5 times.

The presence of the first space portion 213, the second space portion 261, and the third space portion 262 reduce inertia and enhances responsiveness. The effect of each space portion will be described in the second embodiment.

Second Embodiment

Figure 3:
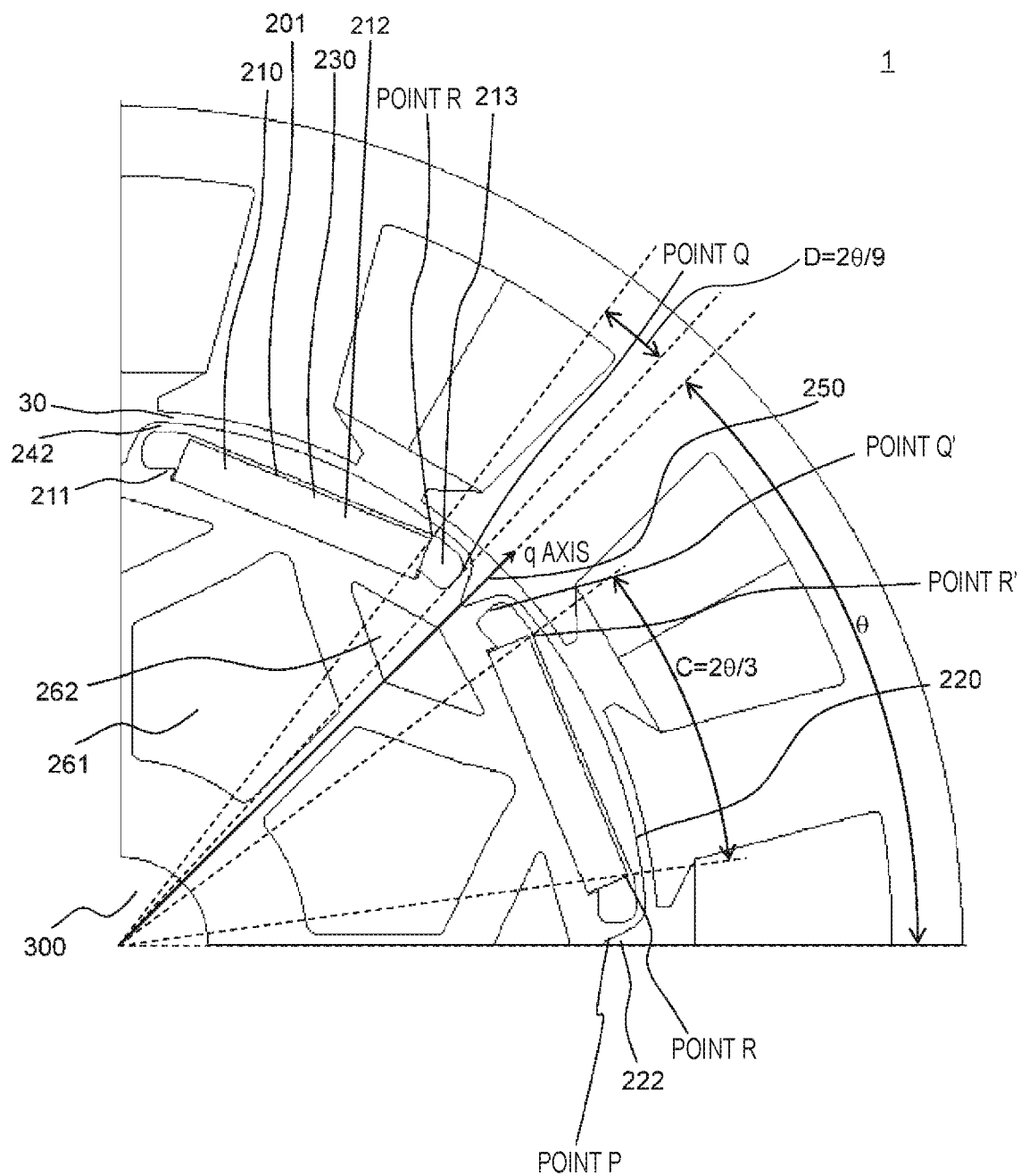
FIG. 3 is a cross-sectional view of a ¼ circumference in a rotary surface of a permanent magnet type rotary electric machine of the second embodiment.

Next, a permanent magnet type rotary electric machine 1 of the second embodiment of the present invention will be described with reference to FIG. 3. FIG. 3 is a cross-sectional view of a ¼ circumference in a rotary surface of the permanent magnet type rotary electric machine 1 of the second embodiment, and corresponds to FIG. 2 described in the first embodiment. A part of the description common to the first embodiment will be omitted.

In FIG. 3, when an angle at which the center of the magnetic pole portion 220 is viewed is a magnetic pole pitch angle, the radial thickness of the umbrella-shaped core 230 is smaller than the rotation radius×(1−cos(magnetic pole pitch angle/2))×0.55+bridge width. Here, an intersection of a straight line parallel to a magnetic pole portion center line from a point closest to a magnetic pole portion center of the magnet stopper portion 211 and the inner periphery of the umbrella-shaped core 230 is defined as a point R. A similar point facing the point R of an adjacent magnetic pole is defined as a point R'. At this time, when a central angle formed by the point R and the point R' facing the adjacent magnet accommodation portion 212 is C, C/(magnetic pole pitch angle/2)≈⅔ is true.

When a point at which the angle formed by a straight line connecting the first space portion 213 and the rotation center and the q axis is minimized is defined as a point Q, an angle formed by a straight line connecting the point Q of the first space portion and the center and a straight line connecting the point R and the center is defined as D, D/(magnetic pole pitch angle/2)≈2/9 is true, and the bridge width is substantially constant in a range within D/2 closer to the point R than the point Q. The q axis outer periphery has a groove space portion 222, which is open to the outer periphery of the rotor and has a wider circumferential width toward the outer peripheral side. The groove space portion 222 reduces inertia without reducing torque.

Here, the outer peripheral shape of the magnetic pole portion 220 in the second embodiment is a cylindrical shape, and its radius coincides with the radius of the rotor 20 in a range within D/2 closer to the umbrella-shaped core 230 and the point R than the point Q. The angle at which the center of the magnet 210 is viewed is about (magnetic pole pitch angle×⅔), and the magnet 210 can be brought closer to the stator 10 than that in the first embodiment. In the shape of FIG. 3 of the second embodiment, the radial thickness-bridge width of the umbrella-shaped core 230 is 0.45 times the rotation radius×(1−cos(magnetic pole pitch angle/2)), and is smaller than 0.68 times the shape of FIG. 2 of the first embodiment.

Here, when motor characteristics are evaluated by three-dimensional magnetic field analysis simulation, torque/magnet usage is 1.1 times that in the first embodiment. This is because a decrease in torque is gentler than a decrease in magnet width, and because the thickness of the umbrella-shaped core 230 is thin, and the torque is larger when the magnet 210 is closer to the stator 10. Although the torque decreases due to the increase in the thickness of the umbrella-shaped core 230, if the radial thickness-bridge width of the umbrella-shaped core 230 is equal to or less than 0.55 times the rotation radius×(1−cos(magnetic pole pitch angle/2)), the decreases becomes equal to or less than 1.5% with respect to the shape of FIG. 3. Therefore, the radial thickness-bridge width of the umbrella-shaped core 230 is desirably equal to or less than 0.55 times the rotation radius×(1−cos(magnetic pole pitch angle/2)). Three-dimensional magnetic field analysis simulation is used to evaluate the following motor characteristics.

In the second embodiment, in addition to the increase in the first space portion 213 and the addition of the groove space portion 222, the magnet width decreases and the magnet 210 approaches the stator 10, and the second space portion 261 increases toward the outer peripheral side, so that the rotor core 200 is thinned particularly on the outer peripheral side. Therefore, the inertia ratio with reference to the case where there is no space portion except for the magnet 210 in the cylindrical rotor core 200 is reduced by 5.1% as compared with the first embodiment. The positional relationship and the shape of the second space portion 261 and the third space portion 262 are the same as those in the first embodiment. Hereinafter, effects of each space portion will be described.

Figure 4A:
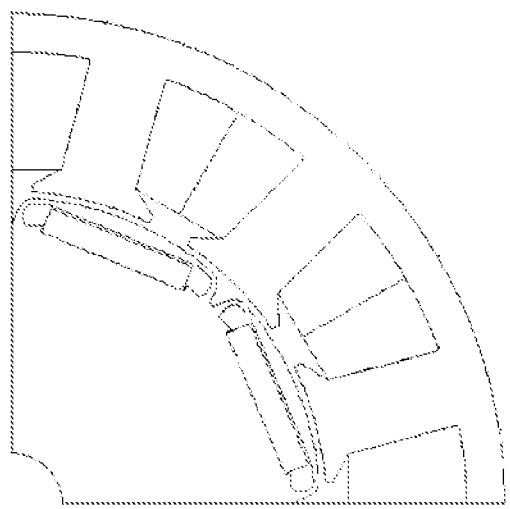
FIG. 4A is a cross-sectional view of a ¼ circumference in a rotary surface of a permanent magnet type rotary electric machine provided with a first space portion and a groove space portion.
Figure 4B:
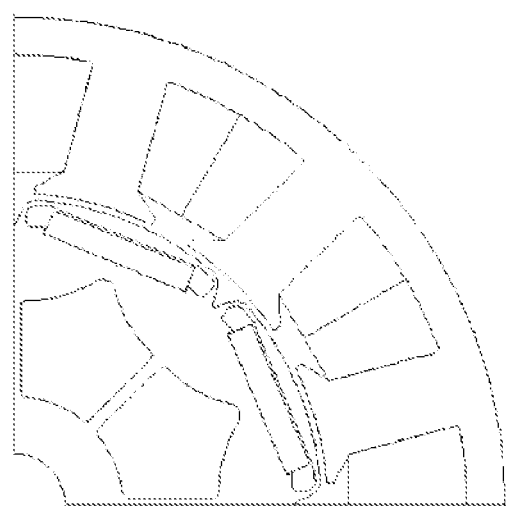
FIG. 4B is a cross-sectional view of a ¼ circumference in a rotary surface of a permanent magnet type rotary electric machine provided with a first space portion, a groove space portion, and a second space portion.
Figure 4C:
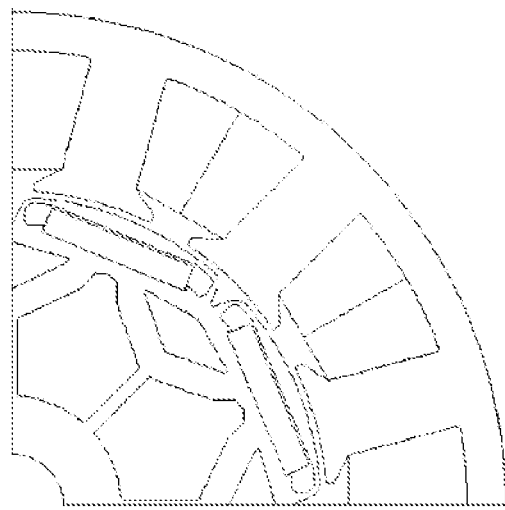
FIG. 4C is a cross-sectional view of a ¼ circumference in a rotary surface of a permanent magnet type rotary electric machine provided with a first space portion, a groove space portion, a second space portion, and a third space portion of the second embodiment.
Figure 5:
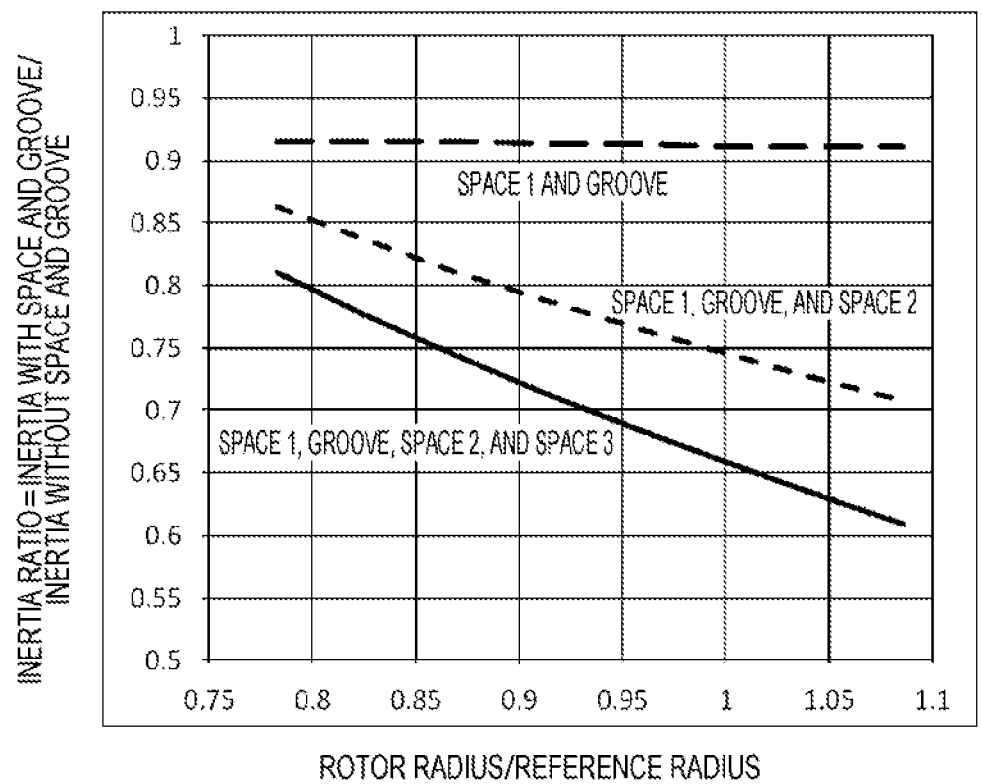
FIG. 5 is a view illustrating a change in inertia with respect to a rotor radius.
Figure 6:
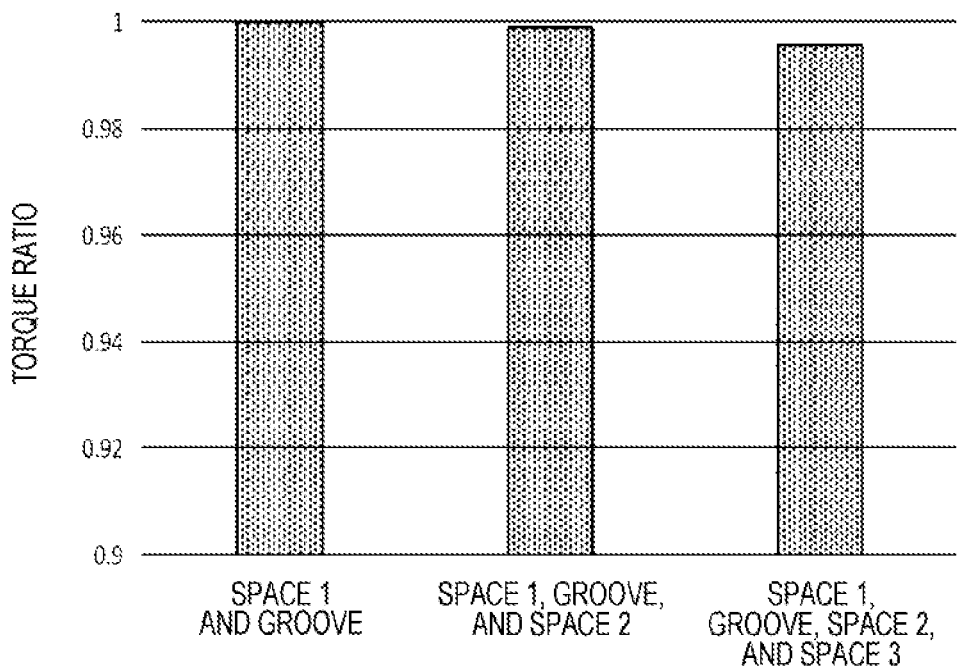
FIG. 6 is a view illustrating a change in torque at a constant rotor radius depending on the presence or absence of a space portion.

Here, the influence of the presence or absence of the third space portion 262 and the presence or absence of the groove space portion 222 on rotor inertia and torque will be described with reference to FIGS. 4A, 4B, 4C, and 5 to 8. FIG. 4A is a cross-sectional view of a ¼ circumference in a rotary surface of the permanent magnet type rotary electric machine 1 provided with the first space portion 213 and the groove space portion 222, FIG. 4B is a cross-sectional view of a ¼ circumference in a rotary surface of the permanent magnet type rotary electric machine 1 provided with the first space portion 213, the groove space portion 222, and the second space portion 261, and FIG. 4C is a cross-sectional view of a ¼ circumference in a rotary surface of the permanent magnet type rotary electric machine 1 provided with the first space portion 213, the groove space portion 222, the second space portion 261, and the third space portion 262 of the second embodiment. FIG. 5 is a view illustrating a change in inertia with respect to the rotor radius, FIG. 6 is a view illustrating a change in torque at a constant rotor radius depending on the presence or absence of the space portion, FIG. 7 is a view illustrating a change in the rotor radius with respect to the inertia, and FIG. 8 is a view illustrating a change in torque at a constant inertia depending on the presence or absence of the space portion.

FIG. 5 is a view illustrating the influence of the presence or absence of the space portion when the inertia ratio with reference to the case where there is no space portion except for the magnet 210 in the cylindrical rotor core 200 (that is, inertia with space and groove/inertia without space and groove) is represented by the vertical axis, and rotor radius/reference radius is represented by the horizontal axis. When the rotor radius increases, the inertia tends to relatively decrease due to the presence of the first space portion 213 and the groove space portion 222, but the change in the relative ratio is small. On the other hand, when the second space portion 261 is present, the more the radius increases, the more the inertia ratio decreases. This is because the radial length of the second space portion 261 increases because the magnet 210 is on the outer peripheral side. When the third space portion 262 is present, the inertia ratio further decreases, and the more the radius increases, the more the inertia ratio decreases. The inertia ratio decreases to 65% near the reference radius, and the response speed can be increased. On the other hand, as illustrated in FIG. 6, the influence of the torque ratio near the reference radius on torque due to the presence or absence of the space portion is small. Even if the second space portion 261 is present, the magnetic path width through which the magnetic flux between adjacent magnets flows is so wide that the decrease in torque can be ignored. Even if the third space portion 262 is present, since the configuration of the second embodiment secures the magnetic path width and suppresses an increase in the magnetic resistance, the decrease in the torque is small and suppressed to 0.4%. Thus, the decrease in torque can be suppressed to be small, and the inertia can be reduced by 10% only by the third space portion 262, and thus the response speed can be increased.

Figure 7:
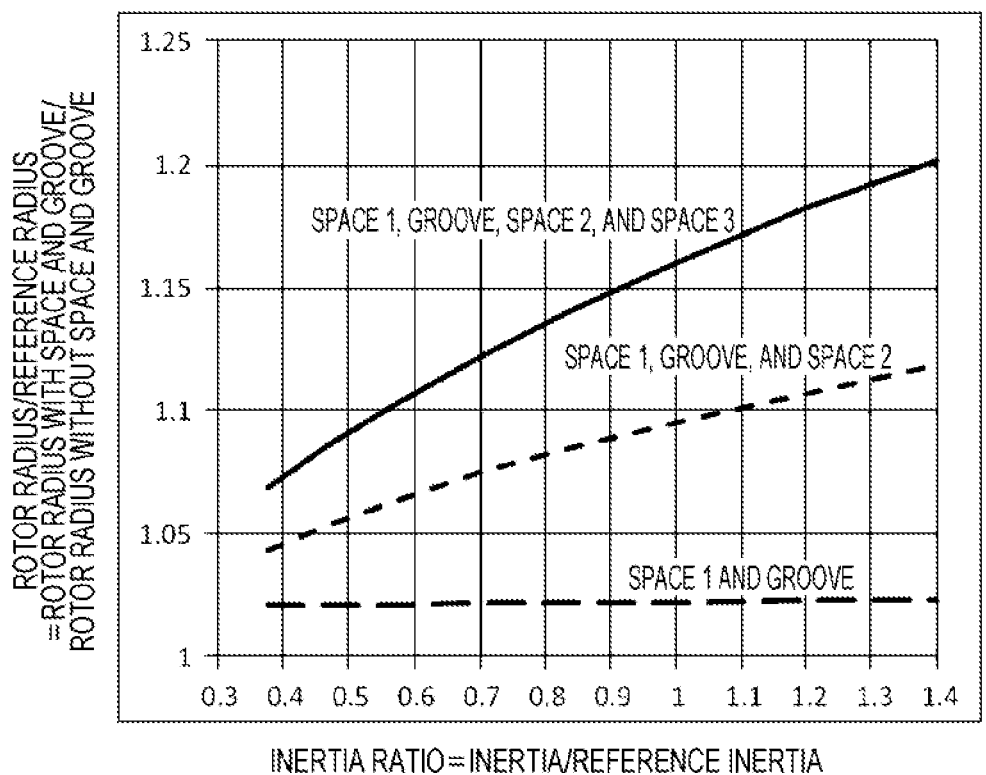
FIG. 7 is a view illustrating a change in a rotor radius with respect to inertia.

In FIG. 7, in the inertia when the space portion does not exist except for the magnet 210 in the cylindrical rotor core 200, the inertia ratio with reference to the inertia of the reference radius is represented by the horizontal axis. Rotor radius/reference radius (that is, rotor radius with space and groove/rotor radius without space and groove) is represented by the vertical axis, and the influence of the presence or absence of the space portion is shown. That is, the ratio at which the rotor radius can be increased in each case of the presence or absence of space•groove as compared with the form without space•groove when the inertia is changed with reference to the inertia in a certain model is shown. As indicated by the thick broken line, even if the inertia ratio increases, the rotor radius increases small due to the presence of the first space portion 213 and the groove space portion 222. On the other hand, as indicated by the thin broken line, when the second space portion 261 is present, the rotor radius increases as the inertia ratio increases. This is because due to the presence of the magnet 210 on the outer peripheral side, the radial length of the second space portion 261 is increased, the inertia is easily reduced, and the rotor radius is easily increased with the same inertia. As indicated by the solid line, when the third space portion 262 is present, the rotor radius further increases, and the more the inertia ratio increases, the more the radius increases. The rotor radius increases by 17% near the reference radius, and torque can be increased.

Figure 8:
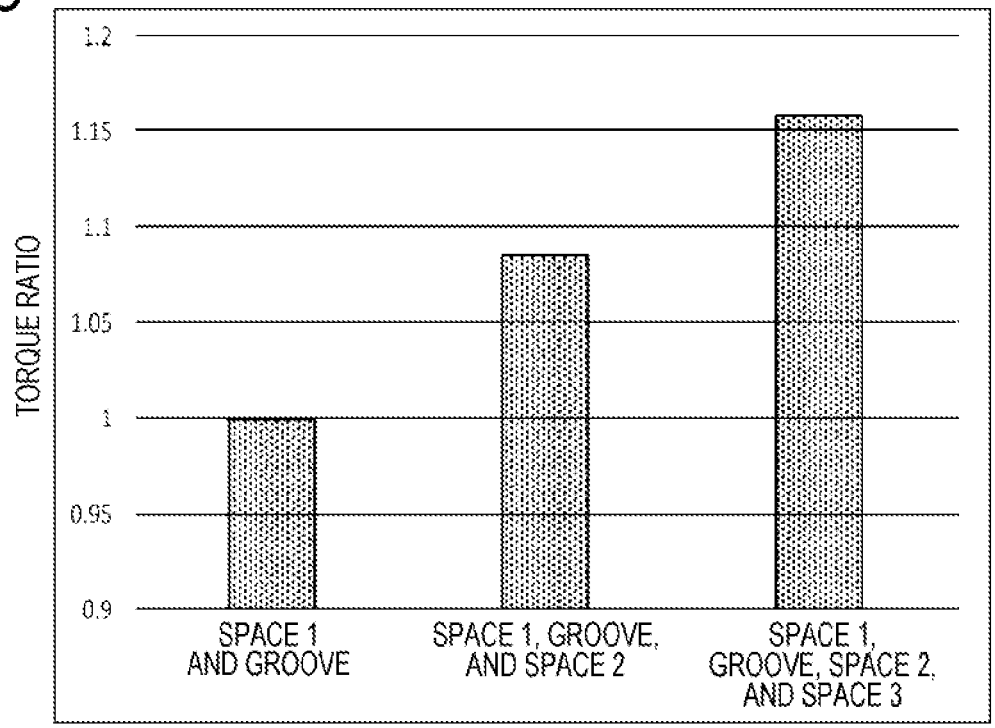
FIG. 8 is a view illustrating a change in torque at a constant inertia depending on the presence or absence of the space portion.

FIG. 8 is an explanatory view illustrating torque increase due to the presence of the space portion in the same inertia with reference to the structure of FIG. 4A. The rotor radius can be increased with the same inertia by the presence of the space portion, and the torque can be increased by the increase in the rotor radius. Therefore, the torque increase is illustrated in FIG. 8. From FIG. 8, the torque can be increased by 9% with the same inertia by the second space portion 261, and the torque can be further increased by 7% with the same inertia by the third space portion 262. This makes it possible to increase the response speed.

Thus, as seen from the description with reference to FIGS. 4A to 8, a high response speed can be achieved by the third space portion 262, which is located on the inner peripheral side relative to the magnet 210, is located between the second space portion 261 and the magnet 210, and is convex toward the inner peripheral side of the q axis 250.

Here, in the second embodiment, as compared with the first embodiment, the inertia decreases and the torque increases, and hence the response speed can be increased. It is indicated that the reduction in inertia by the third space portion 262 is large due to the difference in inertia between the first embodiment and the second embodiment, and thus the effect of the configuration of the present example is large.

Figure 9A:
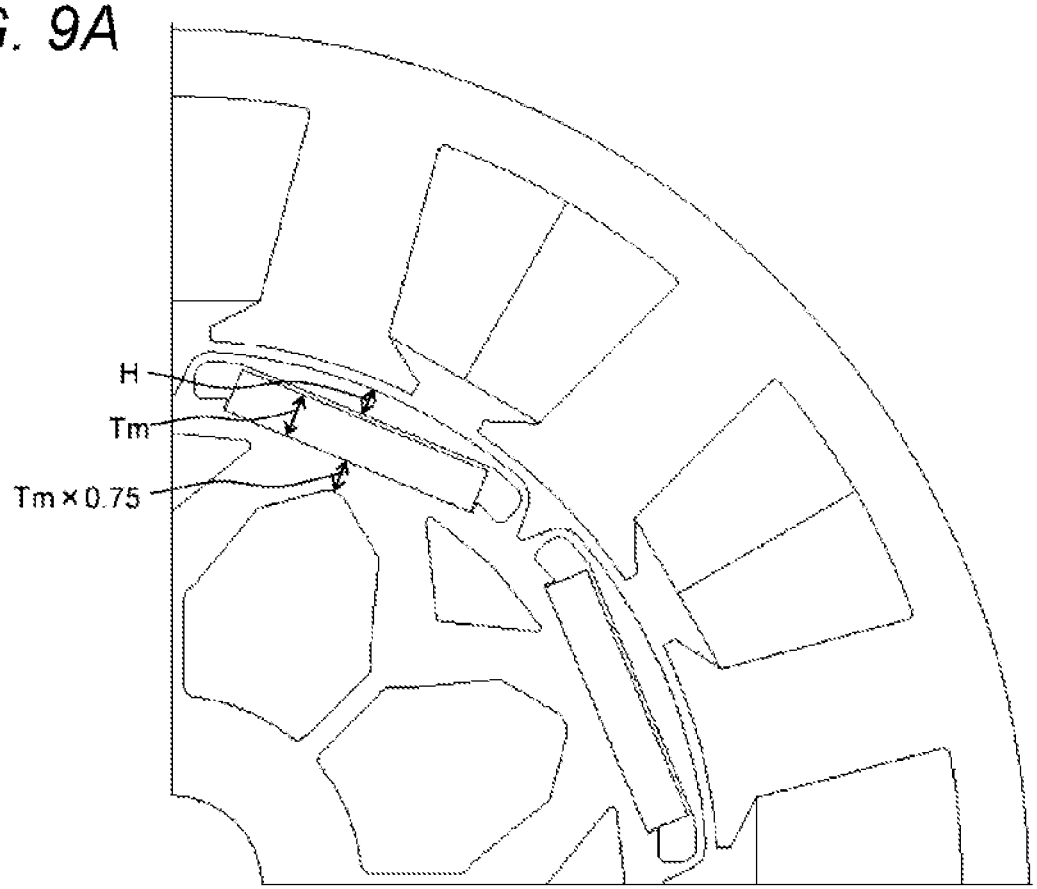
FIG. 9A is a cross-sectional view of a ¼ circumference in a rotary surface of the permanent magnet type rotary electric machine of the second embodiment.
Figure 9B:
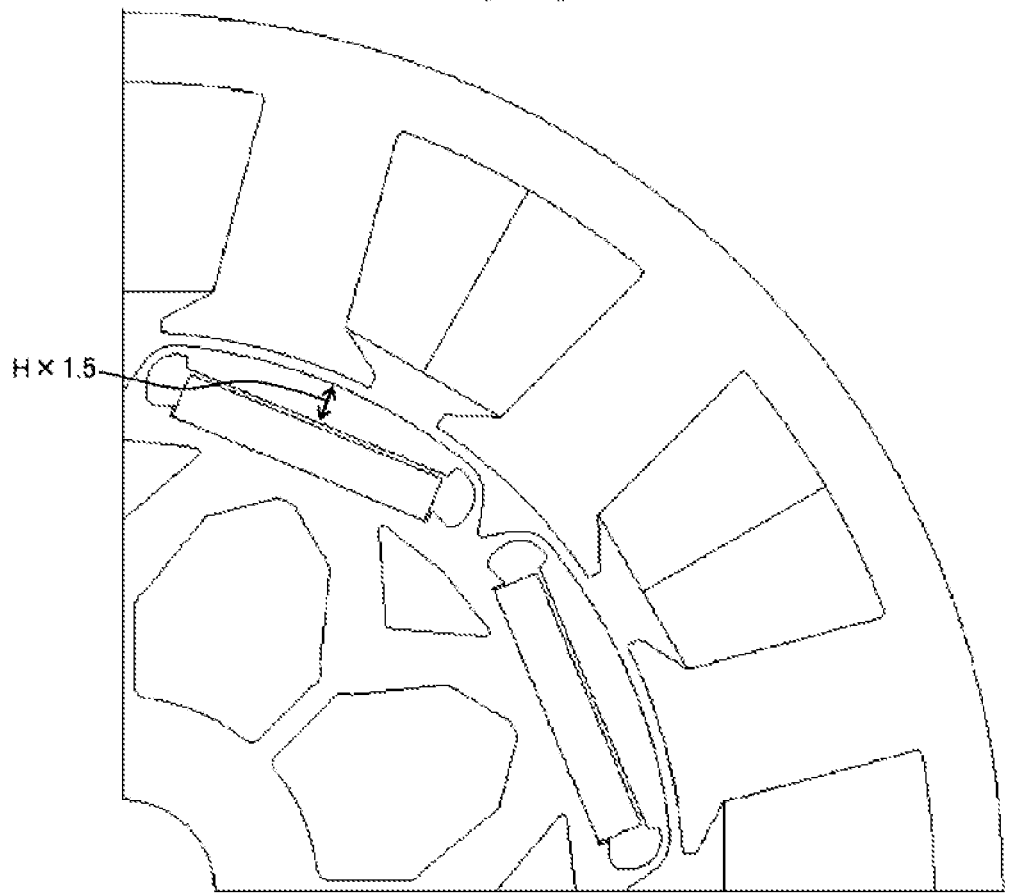
FIG. 9B is a cross-sectional view of a ¼ circumference in a rotary surface of a permanent magnet type rotary electric machine in which a thickness H of an umbrella-shaped core illustrated in FIG. 9A is multiplied by 1.5.
Figure 10:
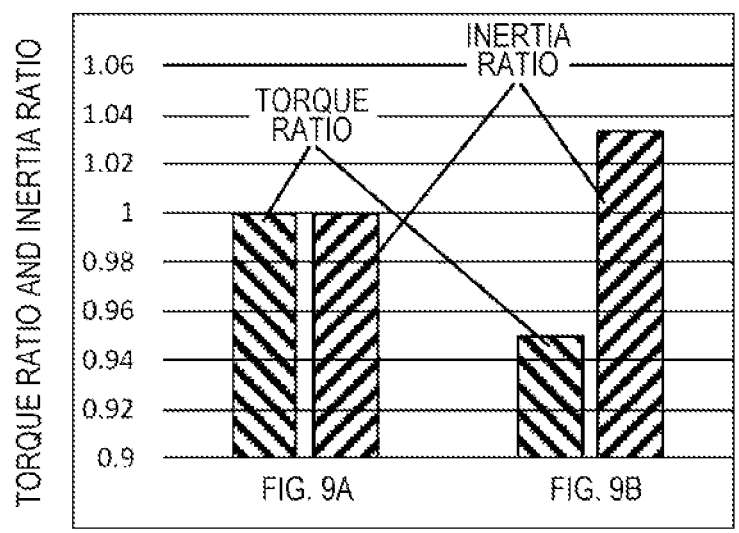
FIG. 10 is a view illustrating changes in torque and inertia in the configurations of FIGS. 9A and 9B.

Next, the influence of the thickness of the umbrella-shaped core 230 will be described with reference to FIGS. 9A, 9B, and 10. FIG. 9A is a cross-sectional view of a ¼ circumference in a rotary surface of the permanent magnet type rotary electric machine 1 of the second embodiment, and FIG. 9B is a cross-sectional view of a ¼ circumference in a rotary surface of the permanent magnet type rotary electric machine 1 in which the thickness H of the umbrella-shaped core 230 illustrated in FIG. 9A is multiplied by 1.5. FIG. 10 is a view illustrating changes in torque and inertia in the configurations of FIGS. 9A and 9B with reference to FIG. 9A.

As illustrated in FIG. 10, the 1.5 times increase in the thickness of the umbrella-shaped core 230 decreases the torque by 5%. This is because the increase in the thickness of the umbrella-shaped core 230 increases the distance between the magnet 210 and the stator 10 and increases the magnetic flux leakage inside the rotor. The inertia has increased by 3.4%. The reason for this is an increase in the outer peripheral side rotor core due to the increase in the thickness of the umbrella-shaped core 230, and retraction of the second space portion 261 and the third space portion 262 to the inner peripheral side. This shows that the magnet position is preferably close to the stator 10 in order to achieve both high torque and low inertia.

The thickness-bridge width of the umbrella-shaped core 230 in FIG. 9B is 0.77 times the rotation radius×(1−cos (magnetic pole pitch angle/2)). Therefore, when the thickness-bridge width of the umbrella-shaped core is 0.55 times the rotation radius×(1−cos(magnetic pole pitch angle/2)), the torque decrease becomes about 1.5% by proportional distribution.

Here, since the rotary electric machine targeted by the present invention is for small-size and low-output applications, the temperature rise due to magnet eddy current caused by the thin thickness of the umbrella-shaped core 230 does not become a problem Therefore, the thin umbrella-shaped core 230 can be used.

Figure 11A:
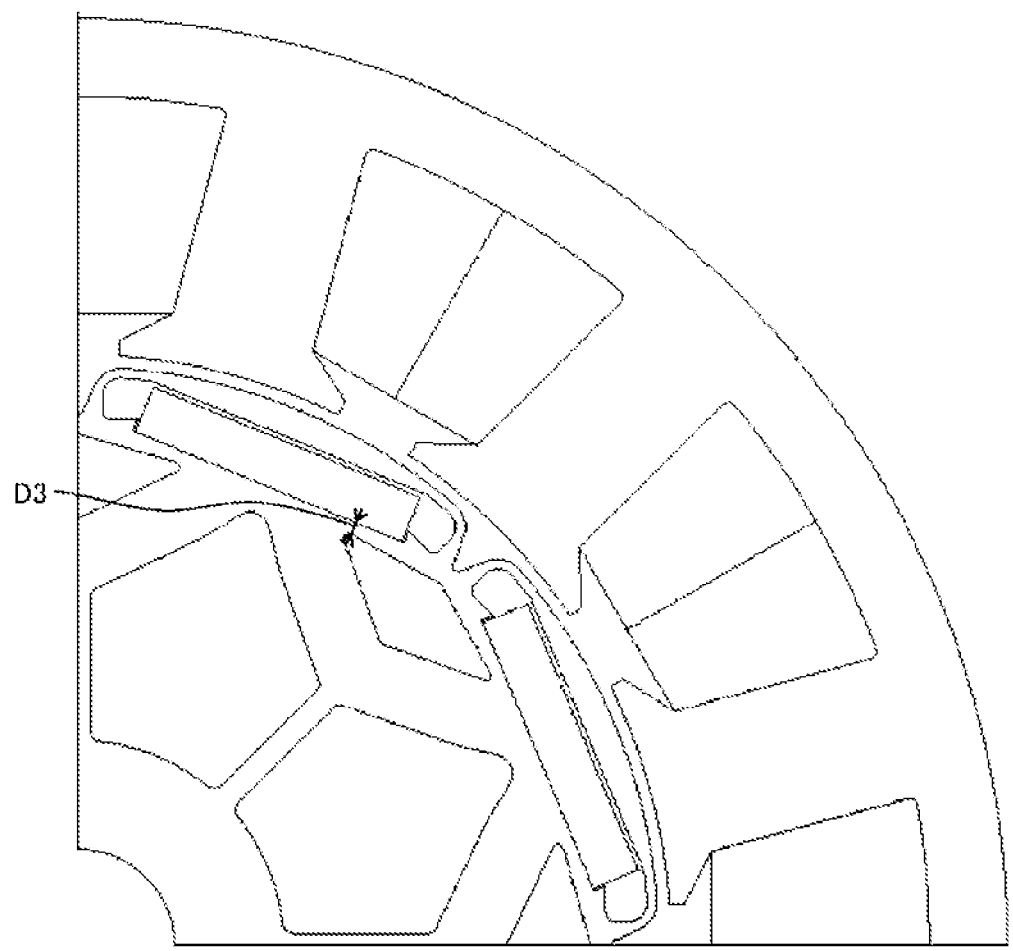
FIG. 11A is a view illustrating a configuration in which a magnet and the third space portion are at a short distance.
Figure 11B:
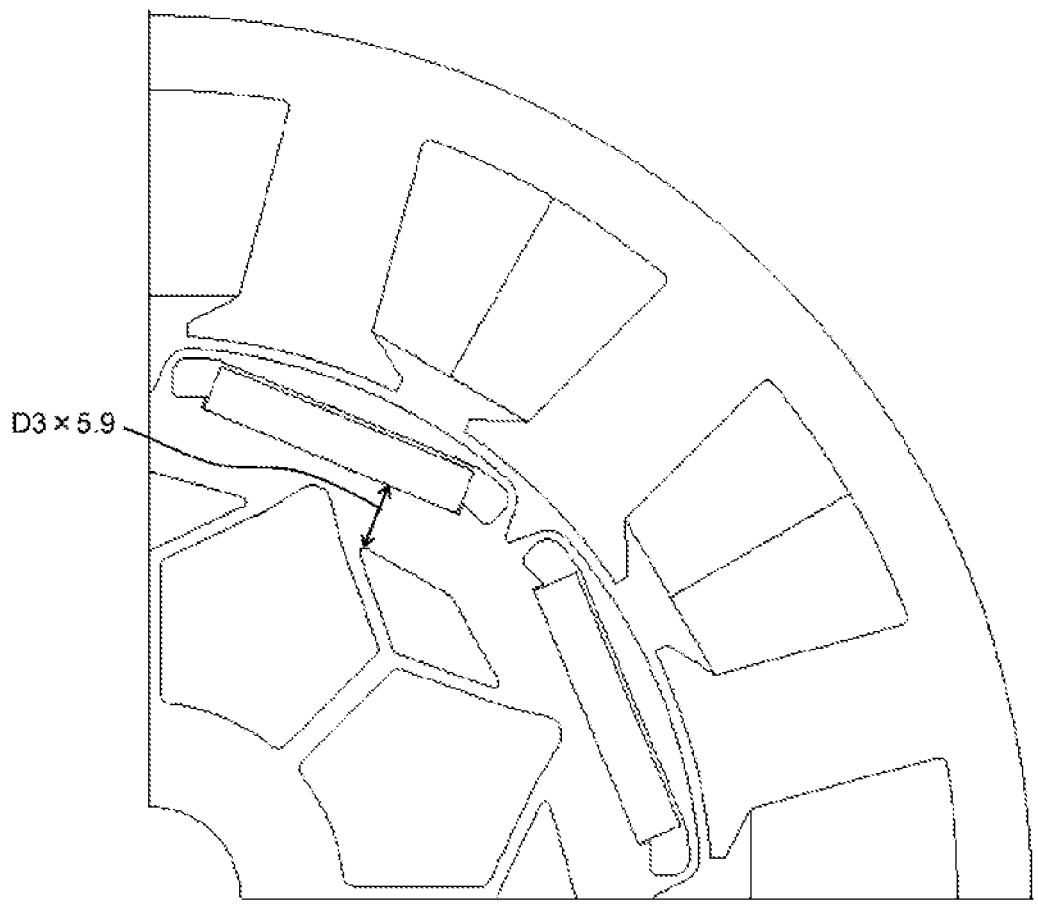
FIG. 11B is a view illustrating a configuration in which the magnet and the third space portion are at a long distance.
Figure 12:
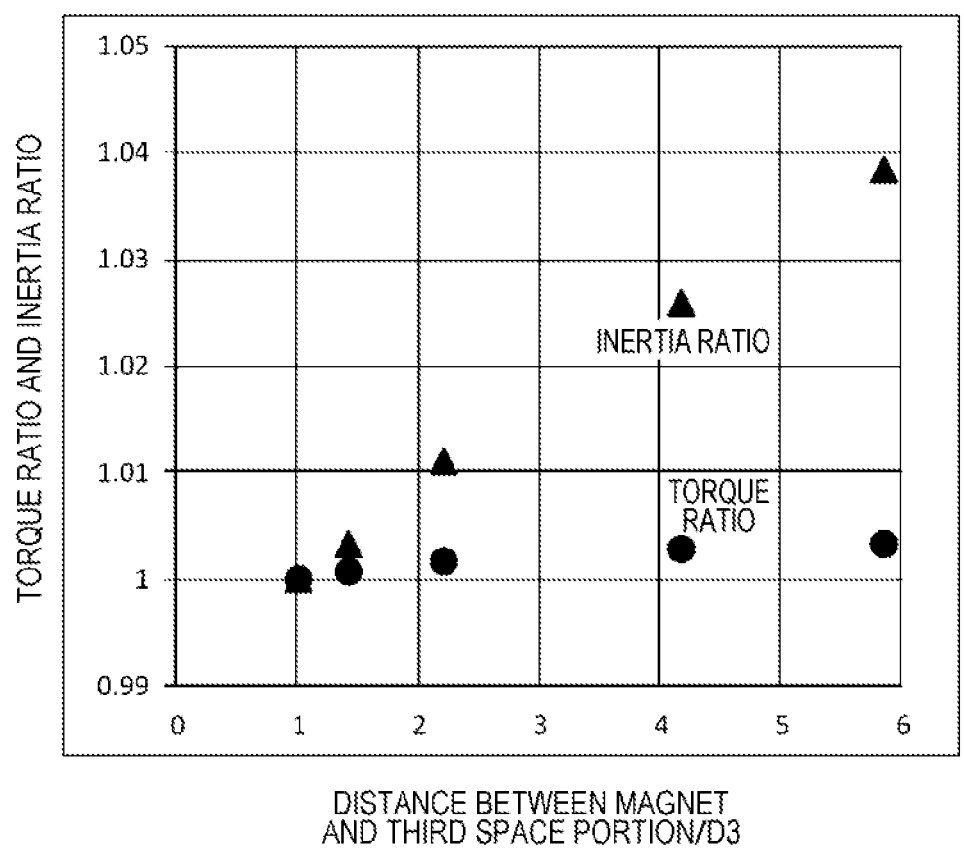
FIG. 12 is a view illustrating changes in torque and inertia depending on a distance between the magnet and the third space portion.

Next, the influence of the distance between the third space portion 262 and the magnet 210 will be described with reference to FIGS. 11A, 11B, and 12. FIG. 11A is a view illustrating the configuration in which the magnet 210 and the third space portion 262 are at a close distance D3, FIG. 11B is a view illustrating the configuration in which the magnet 210 and the third space portion 262 are at a far distance D3×5.9, and the distance between the magnet 210 and the third space portion 262 is 5.9 times that in FIG. 11A. FIG. 12 is a view illustrating changes in torque and inertia depending on the distance between the magnet 210 and the third space portion 262. FIG. 12 illustrates the torque ratio and the inertia ratio with reference to FIG. 11A with the distance/D3 between the magnet 210 and the third space portion 262 as the horizontal axis. As illustrated in FIG. 12, when the distance/D3 between the magnet 210 and the third space portion 262 increases and the third space portion 262 moves to the inner periphery, the torque slightly increases by 0.3% while the inertia increases by nearly 4%. This shows that the inertia decreases and the response becomes high when the third space portion 262 is on the outer peripheral side as much as possible.

Figure 13:
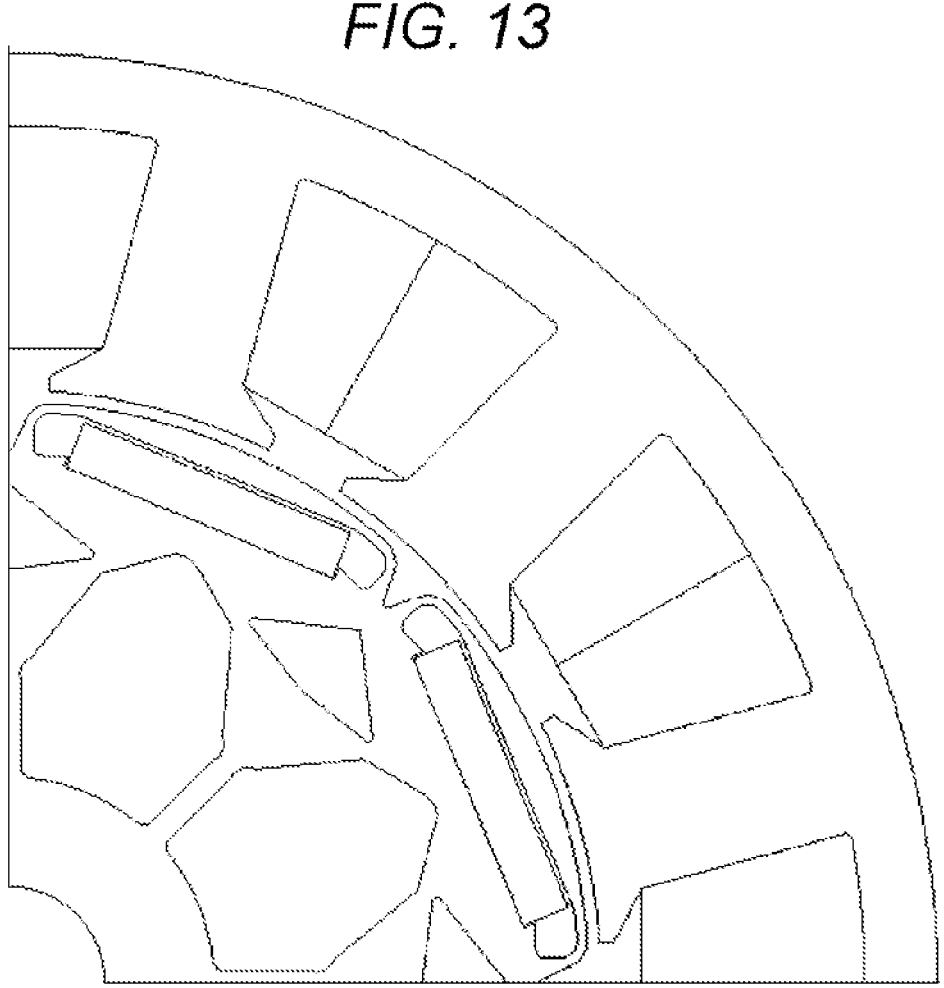
FIG. 13 is a view illustrating a case where the third space portion has a shape that impedes a flow of a magnetic flux.
Figure 14:
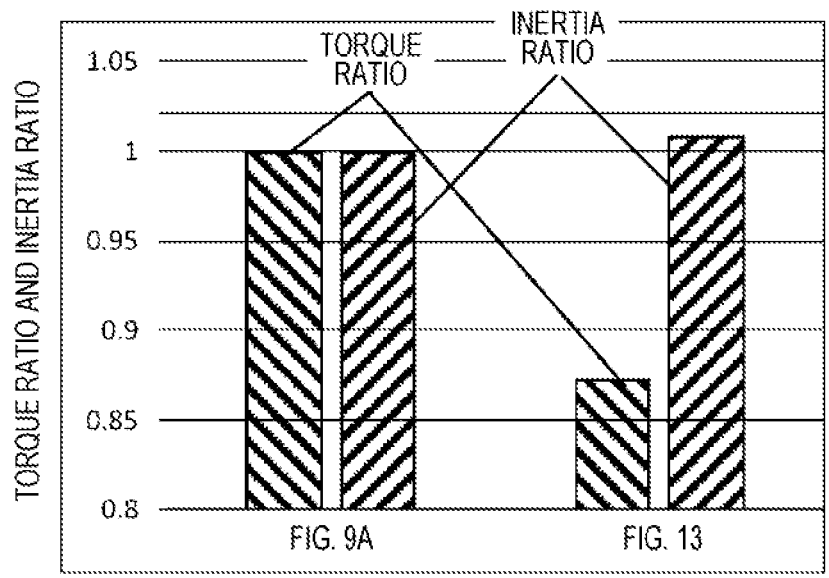
FIG. 14 is a view illustrating changes in torque and inertia in the configurations of FIGS. 9A and 13.

Next, the influence of the orientation of the convex direction on the q axis of the third space portion 262 will be described with reference to FIGS. 9A, 13, and 14. FIG. 13 is a view illustrating the configuration in which the third space portion 262 in FIG. 9A has a shape with the inside and the outside being reversed, and the distance between the second space portion 261 and the third space portion 262 is reduced by the reversal. FIG. 13 is a view illustrating a case where the third space portion has a shape that impedes a flow of a magnetic flux. FIG. 14 is a view illustrating changes in torque and inertia in the configurations of FIGS. 9A and 13 with reference to FIG. 9A, and illustrates changes in torque and inertia depending on whether the orientation of the q axis convex direction of the third space portion 262 is the inner periphery or the outer periphery. As illustrated in FIG. 14, the torque has greatly decreased to 13% due to the reversal of the q axis convex direction of the third space portion 262. This is because the magnetic path width between the second space portion 261 and the third space portion 262 has decreased and the magnetic resistance has increased. The inertia has slightly increased to 0.8%. This is because the outer peripheral side of the third space portion 262 has shifted to the inner periphery. This indicates that the third space portion 262 should be convex toward the inner peripheral side of the q axis 250 rather than convex toward the q axis outer peripheral side in order to achieve high torque and low inertia.

Here, the sum of the minimum width of the core on the outer peripheral side relative to the third space portion 262 and the minimum width of the core between the third space portion 262 and the second space portion 261 is 0.36 times the magnet width/2, and is 0.53 times in the case of FIG. 9A.

Therefore, when this ratio is 0.5 times, the torque decrease becomes about 2% by proportional distribution. Thus, this ratio is preferably equal to or greater than 0.5 times.

Figure 15:
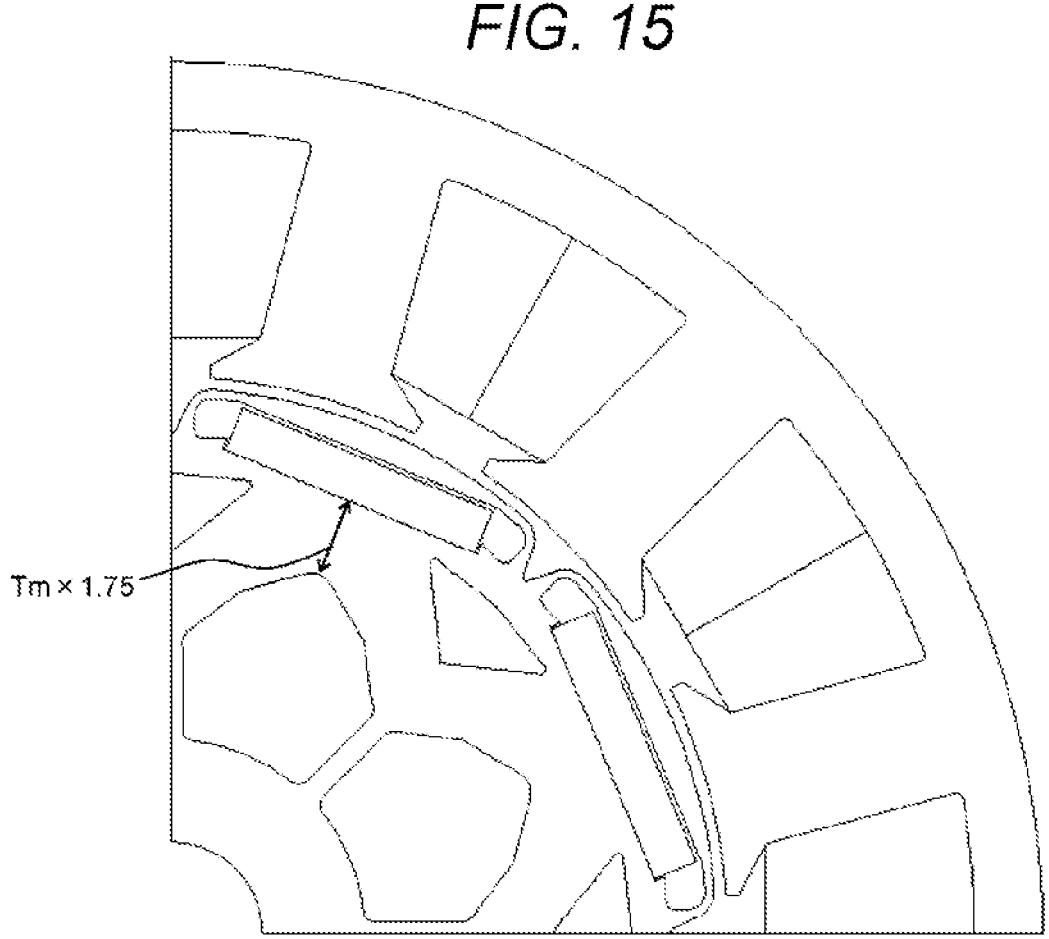
FIG. 15 is a view illustrating a configuration of a case where the magnet and the second space portion are far from each other.
Figure 16:
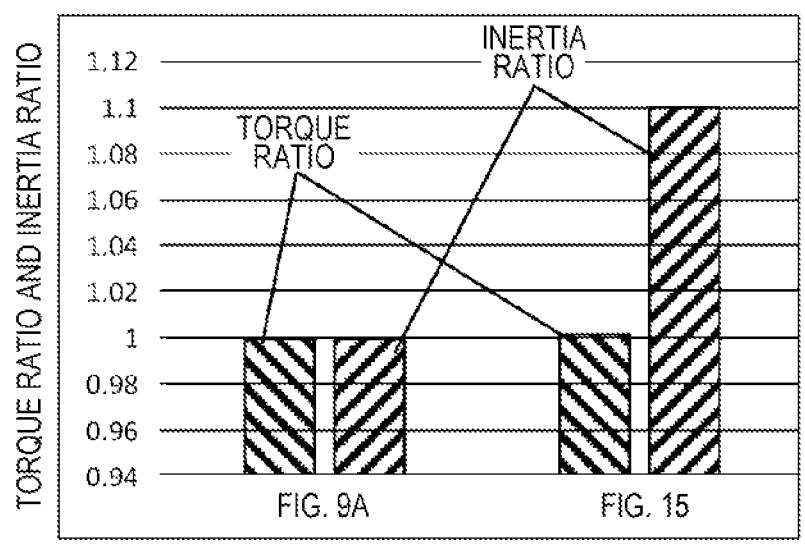
FIG. 16 is a view illustrating changes in torque and inertia in the configurations of FIGS. 9A and 15.

Next, the influence of the distance between the second space portion 261 and the magnet 210 will be described with reference to FIGS. 9A, 15, and 16. FIG. 15 is a view illustrating the configuration of a case where the magnet 210 and the second space portion 261 are far from each other, and in FIG. 9A, it is 0.75 times the distance magnet thickness of the second space portion 261 and the magnet 210, whereas in FIG. 15, it is 1.75 times. FIG. 16 is a view illustrating changes in torque and inertia in the configurations of FIGS. 9A and 15.

As illustrated in FIG. 16, when the distance between the second space portion 261 and the magnet 210 is large, the torque change can be ignored, but the inertia has Increased by 10%. This is because the outer peripheral side of the second space portion 261 contracts to the inner periphery. This indicates that the distance between the second space portion 261 and the magnet 210 is preferably as small as possible for low inertia. In the configuration of the present invention, the presence of the third space portion 262 can reduce the inertia and the circumferential width on the outer peripheral side of the second space portion 261, and therefore the distance between the second space portion 261 and the magnet 210 can be made small without reducing the torque. Therefore, the distance between the second space portion 261 and the magnet 210 can be made equal to or less than the width of the magnet 210, and the inertia can be reduced. The distance between the second space portion 261 and the magnet 210 is preferably equal to or less than the width of the magnet 210.

Thus, as seen from the description with reference to FIGS. 4A to 3, a high response speed can be achieved by the third space portion 262, which is located on the inner peripheral side relative to the magnet 210, is located between the second space portion 261 and the magnet 210, and is convex toward the inner peripheral side of the q axis 250. FIGS. 9A, 13, and 14 indicate that it is necessary to have a convex shape on the inner periphery rather than a convex shape on the q axis outer periphery, and a magnetic path width of equal to or greater than 0.5 times the magnet width/2 is necessary. FIGS. 9A, 9B, and 10 indicate that the thinner the thickness of the umbrella-shaped core 230, the greater the effect is, FIGS. 11A, 11B, and 12 indicate that the closer the distance between the third space portion 262 and the magnet 210 is, the greater the effect is, and FIGS. 9A, 15, and 16 indicate that the closer the distance between the second space portion 261 and the magnet 210 is, the greater the effect is.

These indicate that a high response speed can be effectively achieved by the configuration of the present invention.

When the permanent magnet type rotary electric machine 1 of the present embodiment is used for the eVTC, it becomes easy to optimally control the opening/closing timing of the intake/exhaust valve of the engine in accordance with the engine speed and the load. This makes it possible to improve output and fuel efficiency of the engine. Furthermore, the adoption of the permanent magnet type rotary electric machine 1 of the present embodiment is not limited to the automobile field but can also be applied to an industrial rotary electric machine requiring responsiveness.

Third Embodiment

Figure 17:
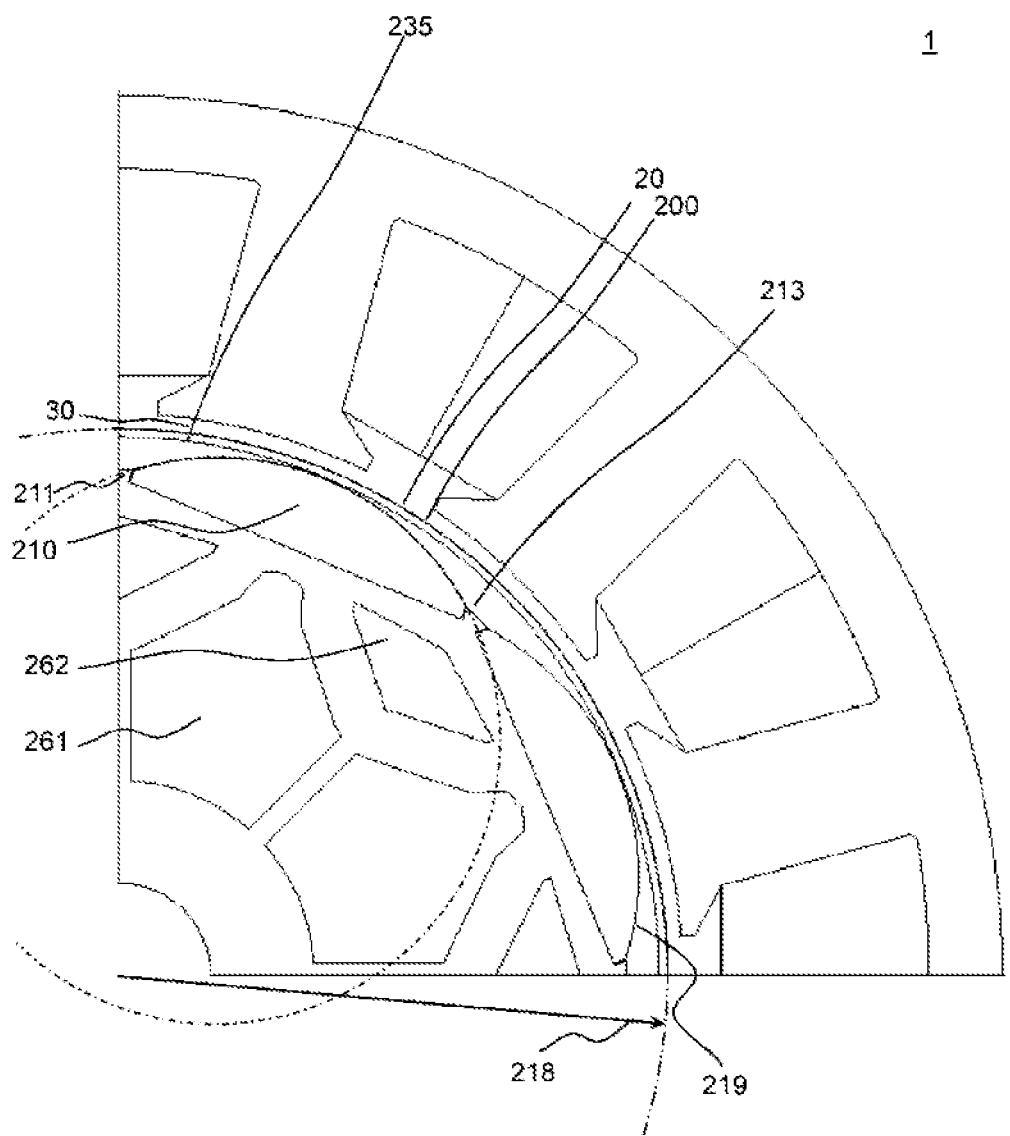
FIG. 17 is a cross-sectional view of a ¼ circumference in a rotary surface of a permanent magnet type rotary electric machine of a third embodiment.

Next, a permanent magnet type rotary electric machine 1 of the third embodiment of the present invention will be described with reference to FIG. 17. FIG. 17 is a cross-sectional view of a ¼ circumference in a rotary surface of the permanent magnet type rotary electric machine 1 of the third embodiment, and corresponds to FIG. 2 described in the first embodiment. A part of the description common to the first embodiment will be omitted.

The permanent magnet type rotary electric machine 1 described in the first embodiment is an embedded permanent magnet type rotary electric machine, but the permanent magnet type rotary electric machine 1 of the present embodiment is a surface permanent magnet type rotary electric machine.

There are provided the magnet 210 on the outer periphery of the rotor core 200, the magnet stopper portions 211 on both sides in the circumferential direction of the magnet 210, a nonmagnetic metal tube 235 that covers the outer periphery of the magnet 210 and is continuous in the circumferential direction, the first space portion 213 that is on the outer periphery of the magnet stopper portion 211 and is partitioned by the magnet 210 and the metal tube 235, the second space portion 261 in which the distance from the magnet 210 inside relative to the magnet 210 is equal to or less than the magnet thickness and the radial length of the magnetic pole center is longest, and the third space portion 262 that is located between the second space portion 261 and the magnet 210 on the inner peripheral side relative to the magnet 210 and has a convex shape on the inner peripheral side of the q axis 250.

Here, the magnet 210 in the third embodiment has a shape called a D shape in a cross section in a rotary surface, and in the present embodiment, it has a shape having a large circumferential length with a straight inner periphery and an arc outer periphery. This shape is a shape in which the magnet usage is about 60% larger than that in the second embodiment, and thus higher torque can be obtained than in the second embodiment. However, torque/magnet usage is 30% less than that in the second embodiment. Since the magnet 210 is thick, the second space portion 261 and the third space portion 262 move to the inner peripheral side, and thus, the inertia becomes 3.4% larger than that of the second embodiment in terms of the inertia ratio with reference to the case where there is no space portion except for the magnet 210 in the cylindrical rotor core 200.

The positional relationship and the shape of the second space portion 261 and the third space portion 262 are the same as those in the first embodiment. Therefore, also in the surface permanent magnet type rotary electric machine, the third space portion 262 reduces the inertia similarly to the description of FIGS. 4A to 16.

Fourth Embodiment

Figure 18:
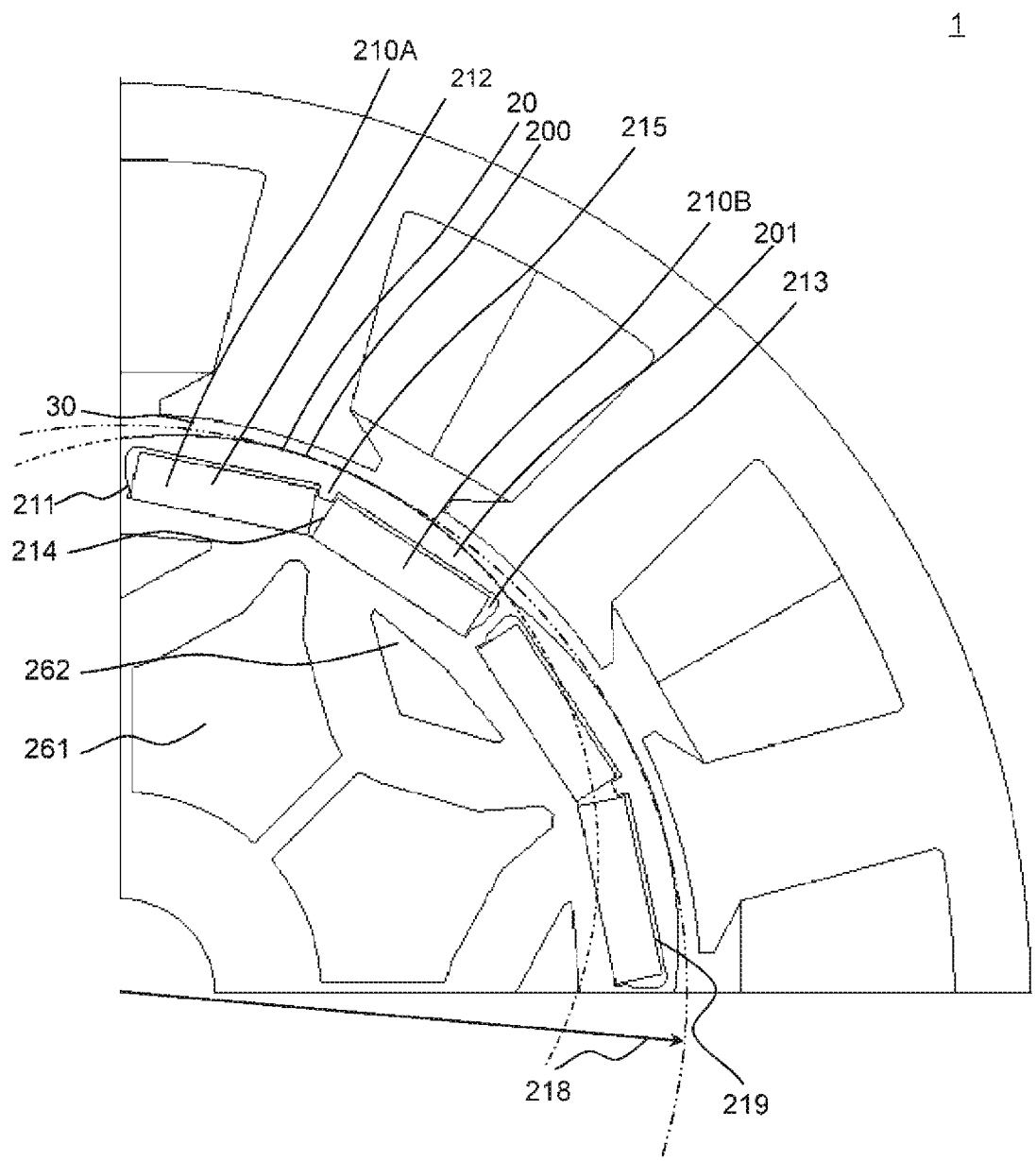
FIG. 18 is a cross-sectional view of a ¼ circumference in a rotary surface of a permanent magnet type rotary electric machine of a fourth embodiment.

Next, an embedded permanent magnet type rotary electric machine 1 of the fourth embodiment of the present invention will be described with reference to FIG. 18. FIG. 18 is a cross-sectional view of a ¼ circumference in a rotary surface of the permanent magnet type rotary electric machine 1 of the fourth embodiment, and corresponds to FIG. 2 described in the first embodiment. A part of the description common to the first embodiment will be omitted.

The permanent magnet type rotary electric machine 1 of the first embodiment is the straight-line type embedded permanent magnet type rotary electric machine 1 having one magnet 210 in the magnetic pole portion 220 as illustrated in FIG. 2. However, the permanent magnet type rotary electric machine 1 of the fourth embodiment is the embedded permanent magnet type rotary electric machine 1 having two magnets 210A and 210B in the magnetic pole portion 220 and having an inverted V shape arrangement in which an angle formed by outer peripheral side surfaces of the two magnets 210A and 210B is larger than 180 degrees as illustrated in FIG. 18.

In FIG. 18, the rotor core 200 includes one magnet insertion hole 201 that is long in the circumferential direction, the magnet accommodation portion 212 provided between the two magnet stopper portions 211 at both ends of the magnet insertion hole 201, and the umbrella-shaped core 230 on the outer peripheral side of the magnet accommodation portion 212. The radius of a magnetic pole arc 219 of the umbrella-shaped core 230 is smaller than a rotation radius 218 of the rotor 20, and the two magnets 210A and 210B are arranged in the magnet insertion hole 201 to form the inverted V shape arrangement in which the angle formed ivy the outer peripheral side surfaces of the two magnets 210A and 210B is larger than 180 degrees. The rotor core 200 has a magnet stopper portion B215 on the inner peripheral side of the center of the umbrella-shaped core 230 and a first space portion B214 on the inner peripheral side of the magnet stopper portion B215.

Here, the arc radius of the magnetic pole portion 220 in the fourth embodiment is smaller than the rotation radius of the rotor 20 and can cause a decrease in torque, but the torque is increased by extending the magnet width to the magnetic pole end part. Since it is possible to reduce the pulsation of the torque by making the arc radius of the magnetic pole portion 220 smaller than the rotation radius of the rotor 20, it is possible to increase the minimum value of the pulsating torque.

At the time of starting, unless torque for rotating the rotor 20 against load is generated, the motor does not start to rotate. Therefore, the minimum value of the pulsating torque needs to be larger than the required torque at the time of starting. The inventor has found it possible to increase the minimum value of the pulsating torque by making the arc radius of the magnetic pole portion 220 smaller than the rotation radius of the rotor 20. That is, this configuration makes it possible to speed up the response from the start.

The positional relationship and the shape of the second space portion 261 and the third space portion 262 are the same as those in the first embodiment. Therefore, in the embedded permanent magnet type rotary electric machine of the fourth embodiment, the presence of the third space portion 262 reduces the inertia similarly to the description of FIGS. 4A to 16.

Figure 19:
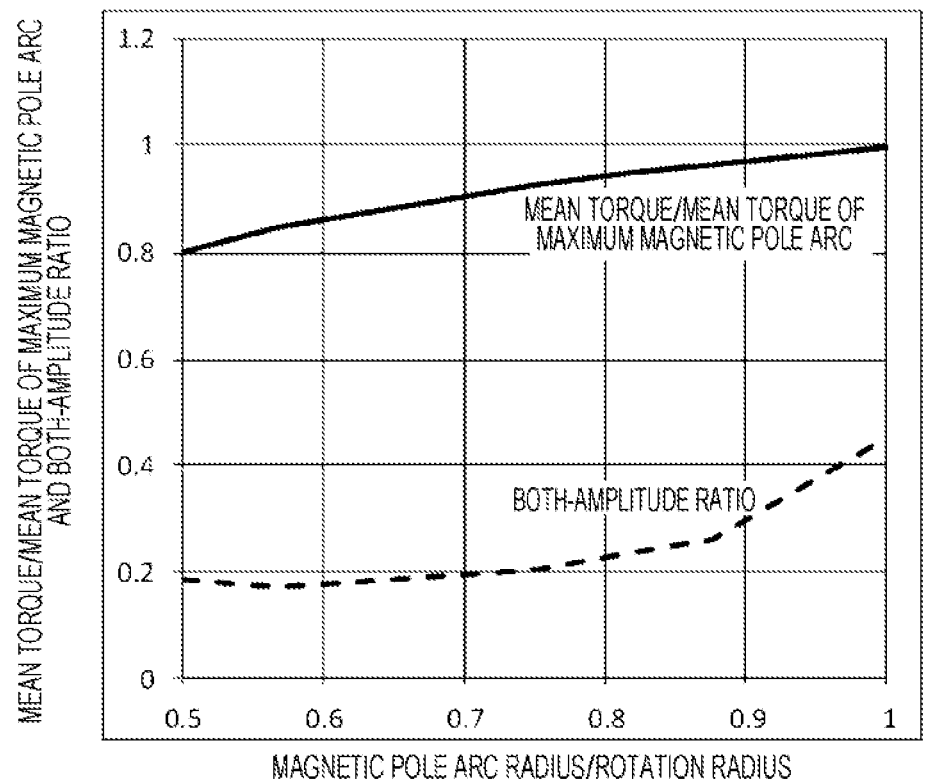
FIG. 19 is a view illustrating changes in mean torque and both amplitudes depending on a magnetic pole arc radius of the fourth embodiment.
Figure 20:
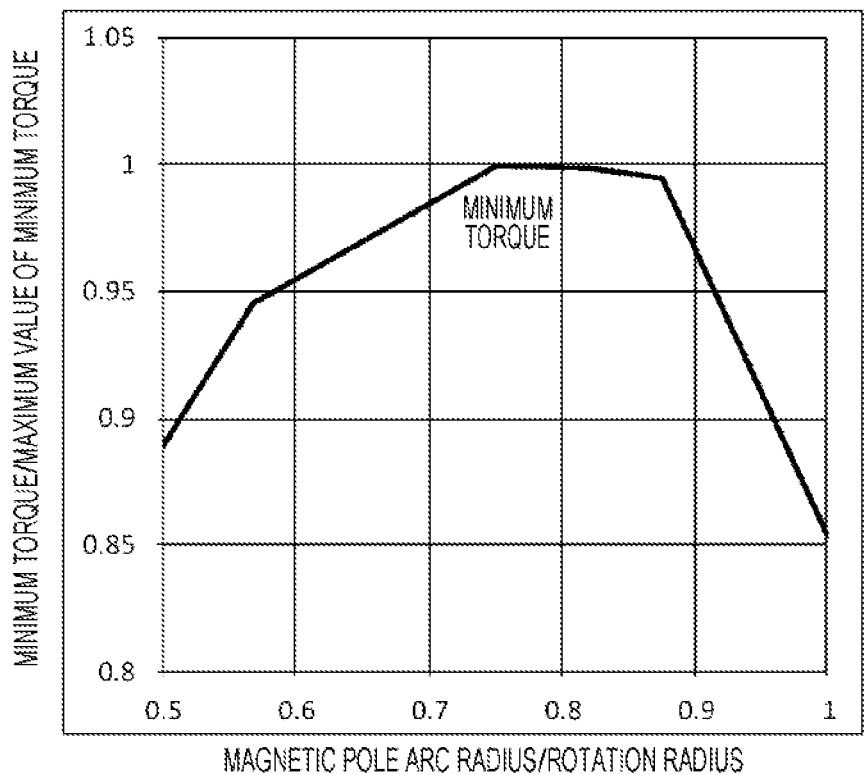
FIG. 20 is a view illustrating a change in minimum torque depending on the magnetic pole arc radius of the fourth embodiment.
Figure 21:
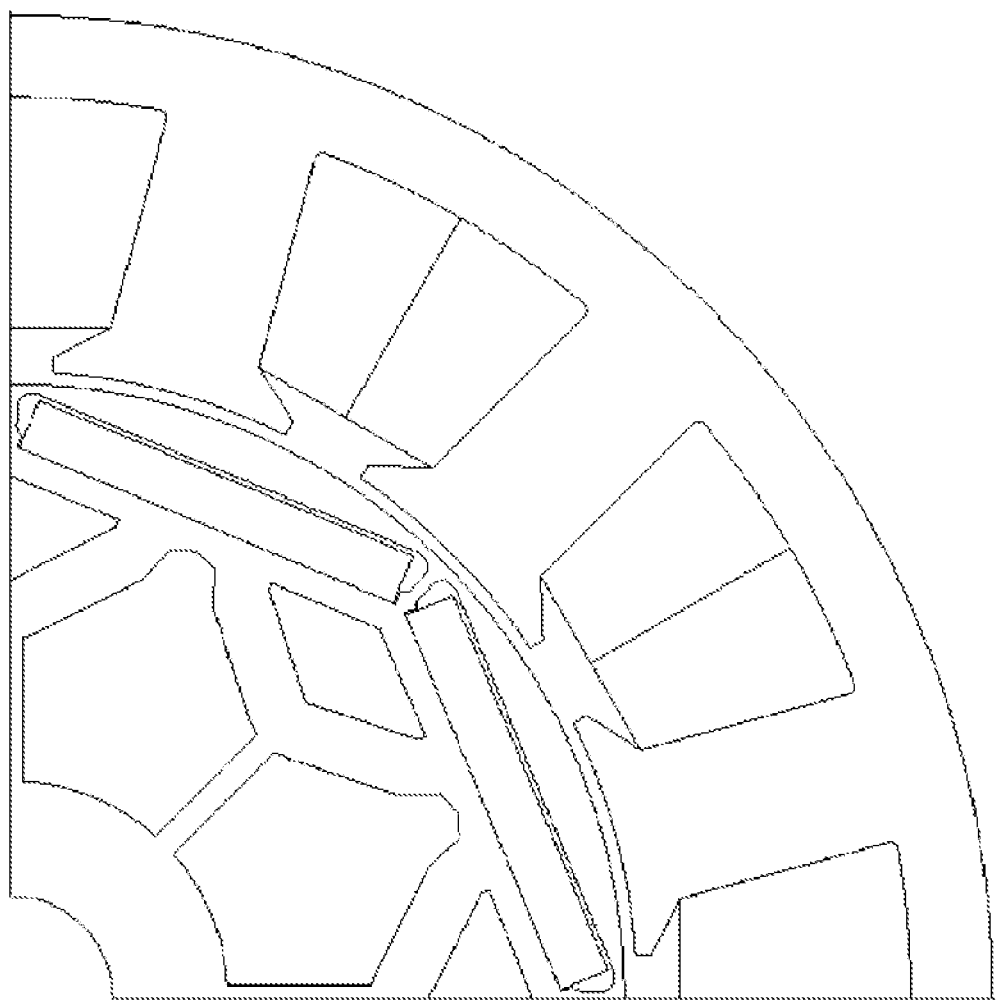
FIG. 21 is a cross-sectional view of a ¼ circumference in a rotary surface of a straight-line type embedded permanent magnet type rotary electric machine of the first embodiment.

Here, it will be described with reference to FIGS. 19 to 21 that the configuration of the present embodiment makes it possible to increase the minimum value of the pulsating torque. FIG. 19 is a view illustrating changes in mean torque and both amplitudes depending on the magnetic pole arc radius of the fourth embodiment, where mean torque/(mean torque at magnetic pole are radius) and both amplitudes/ mean torque are represented by the vertical axis, and magnetic pole arc radius/rotation radius is represented by the horizontal axis. In FIG. 19, the both-amplitude ratio (both amplitude/mean torque) indicates the magnitude of torque pulsation. FIG. 20 is a view illustrating a change in minimum torque depending on the magnetic pole arc radius of the fourth embodiment, where minimum torque/maximum value of minimum torque is represented by the vertical axis, and magnetic pole arc radius/rotation radius is represented by the horizontal axis. Here, when the magnetic pole arc radius and the rotation radius are equal, the angle formed the outer peripheral side surfaces of the two magnets 210A and 210B becomes 180 degrees, which is equivalent to that of the straight-line type embedded permanent magnet type rotary electric machine as illustrated in FIG. 21.

As illustrated in FIG. 19, when the magnetic pole arc radius decreases, the mean torque decreases. At the same time, the torque pulsation decreased, and the both-amplitude ratio was minimized at magnetic pole arc radius/rotation radius=0.57.

On the other hand, as illustrated in FIG. 20, the minimum value of the torque increased with the decrease in the magnetic pole arc radius, and became maximum at magnetic pole arc radius/rotation radius=0.75. Moreover, the minimum torque decreased when the magnetic pole arc radius decreases. The both-amplitude ratio when magnetic pole arc radius/rotation radius=0.5 was about 0.2 (see FIG. 19).

The fourth embodiment is identical to the second embodiment except the rotor structure, but when the fourth embodiment in which the magnet usage is large and the second embodiment are compared, magnetic pole arc radius/rotation radius is equal to or greater than 0.6, and the mean torque in the fourth embodiment became larger than that in the second embodiment. The minimum value of the pulsating torque became larger than that in the second embodiment when minimum torque/maximum value of minimum torque was equal to or greater than 0.91. This indicates that the fourth embodiment has performance higher than that of the second embodiment when magnetic pole arc radius/rotation radius is 0.6 to 0.95. However, since the magnet usage increased by about 29% and the second space portion 261 and the third space portion 262 moved to the inner peripheral side, and thus, the inertia increased by 8.2% in terms of the inertia ratio with reference to the case where there was no space portion except for the magnets 210A and 210B in the cylindrical rotor core 200. Therefore, it is preferable to use a range in which magnetic pole arc radius/rotation radius is 0.65 to 0.9, where large torque is obtained within 3% from the maximum value in FIG. 20.

As described above, it has been presented that the configuration of each embodiment of the present invention is superior to the conventional configuration in terms of suppressing a decrease in torque, reducing inertia, and achieving a high response, and has effects. That is, the structure of the permanent magnet type rotary electric machine 1 described in each embodiment is effective for high response.

When the permanent magnet type rotary electric machine 1 of the present embodiment is used for the eVTC, it becomes easy to optimally control the opening/closing timing of the intake/exhaust valve of the engine in accordance with the engine speed and the load. This makes it possible to improve output and fuel efficiency. Furthermore, the adoption of the permanent magnet type rotary electric machine 1 of the present embodiment is not limited to the automobile field but can also be applied to an industrial rotary electric machine requiring responsiveness.

Note that the present invention is not limited to the above-described embodiments, but includes various modifications and equivalent configurations within the scope of the appended claims. For example, the above-described embodiments have been described in detail for the purpose of explaining the present invention in an easy-to-understand manner, and the present invention is not necessarily limited to those including all the configurations described above. The configuration of a certain embodiment can be replaced partly by the configuration of another embodiment. The configuration of another embodiment may be added to the configuration of a certain embodiment. Another configuration may be added to, deleted from, or replaced with a part of the configuration of each embodiment.

REFERENCE SIGNS LIST 1 permanent magnet type rotary electric machine
10 stator
20 rotor
30 air gap
100 stator core
110 core back
130 teeth
140 winding
200 rotor core
201 magnet insertion hole
210 magnet
211 magnet stopper portion
212 magnet accommodation portion
213 first space portion
214 first space portion
B215 magnet stopper portion.
B218 rotation radius
219 magnetic pole arc
220 magnetic pole portion
222 groove space portion
230 umbrella-shaped core
235 metal tube
242 bridge portion
261 second space portion
262 third space portion
250 q axis
300 shaft

The invention claimed is:

1. A rotary electric machine comprising:
a stator around which a coil is wound; and
a rotor pivotally supported rotatably on an inner peripheral side of the stator, wherein the rotor includes
  a core formed of a soft magnetic metal and
  a magnet mounted on the core, and
  the core includes
    a magnet insertion hole into which the magnet is mounted,
    a first magnet stopper portion provided on a q axis side of the magnet in the magnet insertion hole,
    a magnet accommodation portion provided between the first magnet stopper portions on both sides of the magnet insertion hole,
    a first space portion communicating with the magnet insertion hole,
    a second space portion whose distance from the magnet is equal to or less than a thickness of the magnet, the second space portion formed on an inner peripheral side relative to the magnet,
    a third space portion that has a convex shape on an inner peripheral side of a q axis of the magnet, and is formed between the second space portion and the magnet,
    a bridge portion provided on an outer peripheral side of the first space portion, and
    an umbrella-shaped core portion provided on an outer peripheral side of the magnet accommodation portion, wherein
  when an intersection of a straight line parallel to a magnetic pole portion center line from a point closest to a magnetic pole portion center of the magnet stopper portion and an inner periphery of the umbrella-shaped core portion is defined as a point R,
  a same point facing the point R of an adjacent magnetic pole is defined as a point R', and
  a point at which an angle formed by a q axis and a straight line connecting rotation centers and the first space portions is minimized is defined as a point Q,
  a radial thickness of the umbrella-shaped core portion is smaller than rotation radius×(1−cos (magnetic pole pitch angle/2))×0.55+a width of a bridge portion,
  C/(magnetic pole pitch angle/2) is approximately $2/3$, where C is a central angle formed by a point R and a point R' at which the magnet accommodation portions are adjacent to and face each other,
  D/(magnetic pole pitch angle/2) is approximately $2/9$, where D is an angle formed by a straight line connecting a point Q of the first space portion and a center and a straight line connecting the point R and a center,
  a width of the bridge portion is substantially constant in a range within D/2 closer to the point R than the point Q, and
  a q axis outer periphery of the magnet has a groove space portion that is open to an outer peripheral side of the core and is provided with a wide circumferential width of an outer peripheral side.

2. The rotary electric machine according to claim 1, wherein
  the magnet accommodation portion is formed to be long in a circumferential direction,
  the first space portion is formed on an outer peripheral side of the first magnet stopper portions on both sides of the magnet insertion hole.

3. The rotary electric machine according to claim 1, wherein the rotary electric machine is a motor for an electric variable valve timing device of an automobile.

4. An in-vehicle motor system comprising the rotary electric machine according to claim 1, wherein an electric variable valve timing device is controlled using the rotary electric machine.

5. A rotary electric machine comprising:
a stator around which a coil is wound; and
a rotor pivotally supported rotatably on an inner peripheral side of the stator, wherein the rotor includes
  a core formed of a soft magnetic metal and
  a magnet mounted on the core, and
  the core includes
    a magnet insertion hole into which the magnet is mounted,
    a first magnet stopper portion provided on a q axis side of the magnet in the magnet insertion hole,
    a magnet accommodation portion provided between the first magnet stopper portions on both sides of the magnet insertion hole,
    a first space portion communicating with the magnet insertion hole,
    a second space portion whose distance from the magnet is equal to or less than a thickness of the magnet, the second space portion formed on an inner peripheral side relative to the magnet,
    a third space portion that has a convex shape on an inner peripheral side of a q axis of the magnet, and is formed between the second space portion and the magnet,
    a bridge portion provided on an outer peripheral side of the first space portion,
    an umbrella-shaped core portion provided on an outer peripheral side of the magnet accommodation portion, and a second magnet stopper portion provided on an inner peripheral side of a center of the umbrella-shaped core portion, wherein an arc radius of the umbrella-shaped core portion is smaller than a rotation radius of the rotor, the first space portion is formed on an inner peripheral side of the second magnet stopper portion, and two of the magnets are mounted in the magnet insertion hole in an inverted V shape where an angle of an outer peripheral side surface is larger than 180 degrees.

6. The rotary electric machine according to claim 5, wherein the magnet accommodation portion is formed to be long in a circumferential direction, the first space portion is formed on an outer peripheral side of the first magnet stopper portions on both sides of the magnet insertion hole.

7. The rotary electric machine according to claim 5, wherein the rotary electric machine is a motor for an electric variable valve timing device of an automobile.

8. An in-vehicle motor system comprising the rotary electric machine according to claim 5, wherein an electric variable valve timing device is controlled using the rotary electric machine.

* * * * *